(12) United States Patent
Weber, Jr. et al.

(10) Patent No.: US 12,341,681 B2
(45) Date of Patent: Jun. 24, 2025

(54) CELLULAR NETWORK HEALTH MONITORING IN A CLOUD- COMPUTING ENVIRONMENT

(71) Applicant: DISH Wireless L.L.C., Littleton, CO (US)

(72) Inventors: Kenneth William Weber, Jr., Van Alstyne, TX (US); Dawood Shahdad, Aurora, CO (US); Arjun Sarath, Littleton, CO (US)

(73) Assignee: DISH Wireless L.L.C., Littleton, CO (US)

(*) Notice: Subject to any disclaimer, the term of this patent is extended or adjusted under 35 U.S.C. 154(b) by 494 days.

(21) Appl. No.: 17/722,179

(22) Filed: Apr. 15, 2022

(65) Prior Publication Data
US 2023/0336456 A1      Oct. 19, 2023

(51) Int. Cl.
*H04L 43/55* (2022.01)
*H04L 43/20* (2022.01)

(52) U.S. Cl.
CPC .............. *H04L 43/55* (2022.05); *H04L 43/20* (2022.05)

(58) Field of Classification Search
None
See application file for complete search history.

(56) References Cited

U.S. PATENT DOCUMENTS

2020/0112497 A1* 4/2020 Yenumulapalli ........ H04L 43/10
2022/0232046 A1* 7/2022 Agarwal ............. H04L 65/1069

* cited by examiner

*Primary Examiner* — Joseph E Avellino
*Assistant Examiner* — Ian Michael Harris
(74) *Attorney, Agent, or Firm* — Kilpatrick Townsend & Stockton LLP

(57) ABSTRACT

Various arrangements for performing health monitoring of cellular network functions in a cloud-computing environment are presented. A cloud computing region may be input for analysis. A 5G cellular network core may be implemented on a cloud computing platform. Input of a cellular core function for analysis may also be received. Instantiations of the cellular core function and pods of the cellular core function executed within the cloud computing region can be identified. A customized test query can be performed based on the input of the cellular core function. A status of the cellular core function can be output based on the customized test query.

20 Claims, 7 Drawing Sheets

| ReportClean CleanList contains 36 records |
|---|
| p1w2azlamf01 contains 18 pods in READY and Running |
| p1w2azlepdg01 contains 6 pods in READY and Running |
| p1w2azlsmf01 contains 6 pods in READY and Running |
| p1w2azlupfv01 contains 6 pods in READY and Running |
| ReportIssues IssueList contains 17 records |

| NAMESPACE | NAME | READY | STATUS | RESTARTS | AGE | IP | NODE |
|---|---|---|---|---|---|---|---|
| p1w2azlamf01 | cmm-operator-b68bc8d5d-45fpd | 0/1 | Evicted | 0 | 21d | \<none\> | ip-100-64-19-134.us-west-2.compute.internal |
| p1w2azlamf01 | cmm-operator-b68bc8d5d-7vwh7 | 0/1 | Evicted | 0 | 21d | \<none\> | ip-100-64-19-134.us-west-2.compute.internal |
| p1w2azlamf01 | cmm-operator-b68bc8d5d-8lnsd | 0/1 | Evicted | 0 | 21d | \<none\> | ip-100-64-19-134.us-west-2.compute.internal |
| p1w2azlamf01 | cmm-operator-b68bc8d5d-92r4w | 0/1 | Evicted | 0 | 21d | \<none\> | ip-100-64-19-134.us-west-2.compute.internal |
| p1w2azlamf01 | cmm-operator-b68bc8d5d-bjbk5 | 0/1 | Evicted | 0 | 21d | \<none\> | ip-100-64-19-134.us-west-2.compute.internal |
| p1w2azlamf01 | cmm-operator-b68bc8d5d-gl4pc | 0/1 | Evicted | 0 | 43d | \<none\> | ip-100-64-19-134.us-west-2.compute.internal |
| p1w2azlamf01 | cmm-operator-b68bc8d5d-h5jjx | 0/1 | Evicted | 0 | 21d | \<none\> | ip-100-64-19-134.us-west-2.compute.internal |
| p1w2azlamf01 | cmm-operator-b68bc8d5d-jzgsb | 0/1 | Evicted | 0 | 21d | \<none\> | ip-100-64-19-134.us-west-2.compute.internal |
| p1w2azlamf01 | cmm-operator-b68bc8d5d-mbgx5 | 0/1 | Evicted | 0 | 21d | \<none\> | ip-100-64-19-134.us-west-2.compute.internal |
| p1w2azlamf01 | cmm-operator-b68bc8d5d-pcrvs | 0/1 | Evicted | 0 | 21d | \<none\> | ip-100-64-19-134.us-west-2.compute.internal |
| p1w2azlamf01 | cmm-operator-b68bc8d5d-q7ht6 | 0/1 | Evicted | 0 | 21d | \<none\> | ip-100-64-19-134.us-west-2.compute.internal |
| p1w2azlamf01 | cmm-operator-b68bc8d5d-qmnnw | 0/1 | Evicted | 0 | 21d | \<none\> | ip-100-64-19-134.us-west-2.compute.internal |
| p1w2azlamf01 | cmm-operator-b68bc8d5d-r5gdk | 0/1 | Evicted | 0 | 21d | \<none\> | ip-100-64-19-134.us-west-2.compute.internal |
| p1w2azlamf01 | cmm-operator-b68bc8d5d-s4f9l | 0/1 | Evicted | 0 | 21d | \<none\> | ip-100-64-19-134.us-west-2.compute.internal |
| p1w2azlamf01 | cmm-operator-b68bc8d5d-wtjdj | 0/1 | Evicted | 0 | 21d | \<none\> | ip-100-64-19-134.us-west-2.compute.internal |
| p1w2azlamf01 | cmm-operator-b68bc8d5d-xqx9l | 0/1 | Evicted | 0 | 21d | \<none\> | ip-100-64-19-134.us-west-2.compute.internal |
| p1w2azlamf01 | cmm-operator-b68bc8d5d-zv4nh | 0/1 | Evicted | 0 | 21d | \<none\> | ip-100-64-19-134.us-west-2.compute.internal |

FIG. 5

CELLULAR NETWORK HEALTH MONITORING IN A CLOUD- COMPUTING ENVIRONMENT

BACKGROUND

Cellular networks are highly complex. Historically, cellular components tended to be sourced from one particular vendor, thus making the entity responsible for diagnosing and correcting a problem easy to identify. However, with the advent of the open radio access network (O-RAN) approach and component virtualization, components of cellular networks can be sourced from different vendors and can be executed as special-purpose software executed by general-purpose hardware. This arrangement, along with the complexity of modern 5G New Radio (NR) cellular networks, can benefit from improved component monitoring, analysis, and diagnosis. Embodiments detailed herein can help address such needs.

SUMMARY

Various embodiments are described related to a method for performing health monitoring of cellular network functions in a cloud-computing environment. In some embodiments, a method for performing health monitoring of cellular network functions in a cloud-computing environment is described. The method may comprise receiving, by a cellular network health monitoring system, input of a cloud computing region for analysis. A cellular network core may be implemented on a cloud computing platform that may comprise a plurality of cloud computing regions that may include the cloud computing region. The method may comprise receiving, by the cellular network health monitoring system, input of a cellular core function for analysis. A plurality of cellular core functions may be executed within the cloud computing region on the cloud computing platform. The method may comprise identifying, by the cellular network health monitoring system, instantiations of the cellular core function and pods of the cellular core function executed within the cloud computing region. The method may comprise performing, by the cellular network health monitoring system, a customized test query based on the input of the cellular core function. The method may comprise outputting, by the cellular network health monitoring system, a status of the cellular core function based on the customized test query.

Embodiments of such a method may comprise one or more of the following features: accessing a library of customized test query files. The method may comprise retrieving a customized test query file based on the input of the cellular core function. The customized test query may be obtained from the retrieved customized test query file. The cellular network core may be a 5G New Radio (NR) native cellular core. The status of the cellular core function may comprise a status of each pod of the pods of the cellular network function. The cellular network core function may be selected from the group consisting of an access and mobility management function (AMF), a session management function (SMF), and a user plane function (UPF). The cellular network core may comprise a plurality of logical regional data centers that reside within a national data center. Each logical regional data center of the plurality of logical regional data centers may comprise a common plurality of cellular core functions. The method may further comprise outputting, by the cellular network health monitoring system, an indication of a pod of the cellular core function that may not be functioning properly. The method may further comprise outputting, by the cellular network health monitoring system, a unique identifier of an instantiation of the cellular core function executed within the cloud computing region. The method may further comprise outputting, by the cellular network health monitoring system, a node identifier at which pods of the cellular core function may be executed based on the customized test query. The node identifier may refer to a server system of the cloud computing platform.

In some embodiments, a cellular network implemented using a cloud computing platform is described. The network may comprise a national data center (NDC) executing on the cloud computing platform across multiple cloud computing subregions. The NDC may comprise a plurality of regional data centers (RDCs) executing across the cloud multiple cloud computing subregions. The network may comprise a plurality of network functions of a 5G New Radio (NR) cellular core executed within each RDC of the plurality of RDCs. Each network function of the plurality of network functions may comprise a plurality of pods. The network may comprise a cellular network health monitoring system configured to receive input of a cloud computing region for analysis. A cellular network core may be implemented on a cloud computing platform that may comprise a plurality of cloud computing regions that may include the cloud computing region. The system may be configured to receive input of a cellular core function for analysis. A plurality of cellular core functions may be executed within the cloud computing region on the cloud computing platform. The system may be configured to identify instantiations of the cellular core function and pods of the cellular core function executed within the cloud computing region. The system may be configured to perform a customized test query based on the input of the cellular core function. The system may be configured to output a status of the cellular core function based on the customized test query.

Embodiments of such a network may include one or more of the following features: the cellular network health monitoring system may be executed on the cloud computing platform. The cellular network core function may be selected from the group consisting of an access and mobility management function (AMF), a session management function (SMF), and a user plane function (UPF).

In some embodiments, a non-transitory processor-readable medium is described. The medium may comprise processor-readable instructions configured to cause one or more processors to receive input of a cloud computing region for analysis. A cellular network core may be implemented on a cloud computing platform that may comprise a plurality of cloud computing regions that may include the cloud computing region. The one or more processors may receive input of a cellular core function for analysis. A plurality of cellular core functions may be executed within the cloud computing region on the cloud computing platform. The one or more processors may identify instantiations of the cellular core function and pods of the cellular core function executed within the cloud computing region. The one or more processors may perform a customized test query based on the input of the cellular core function. The one or more processors may output a status of the cellular core function based on the customized test query.

Embodiments of such a network may include one or more of the following features: the processor-readable instructions may be further configured to cause the one or more processors to access a library of customized test query files stored on the cloud computing platform. The one or more processors may retrieve a customized test query file based on the input of the cellular core function. The customized test query may obtained from the retrieved customized test query file. The cellular network core may be a 5G New Radio (NR) native cellular core. The status of the cellular core function may comprise a status of each pod of the pods of the cellular network function. The cellular network core function may be selected from the group consisting of an access and mobility management function (AMF), a session management function (SMF), and a user plane function (UPF). The cellular network core may comprise a plurality of logical regional data centers that reside within a national data center. Each logical regional data center of the plurality of logical regional data centers may comprise a common plurality of cellular core network functions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 illustrates an embodiment of pod statuses as determined by the cellular network health monitoring system for a cloud-computing platform.

DETAILED DESCRIPTION

The virtualization of cellular network components, such as in 5G New Radio (NR) cellular networks can allow for at least some cellular network components to be implemented on a cloud-computing platform. Therefore, rather than having special-purpose hardware operated by a cellular network provider, special-purpose software can be executed on a cloud-computing platform to perform the function of the cellular network component, such as a function within the cellular network core or a component of the radio access network (RAN), such as a centralized unit (CU).

Implementing components of a cellular network using a cloud-computing platform can have significant advantages. The cloud computing platform can have a large amount of computing and storage capability such that when additional processing capabilities, storage capabilities, or both are needed by the cellular network, they can be readily provisioned. For example, if demand requires an adjustment to the cellular network, such as the addition of another CU, no physical changes may be needed; rather, a new CU instantiation can be created on the cloud-computing network and, following configuration, can begin functioning as part of the cellular network almost immediately.

A cellular network that is partially executed on the cloud results in many instantiations of the same component servicing different portions of the cellular network or serving as a back-up in case of failure. For example, hundreds of instantiations of CUs may be executed across different data centers of the cloud computing network to serve different distributed units (DUs) of the cellular network. Similarly, within the core of the cellular network, a particular function may be instantiated many times over, such as to provide service to different geographic regions.

This virtualization of components, along with execution on a cloud computing platform, can make it difficult to locate, monitor, and test particular network functions (which can also be referred to as modules or components). Embodiments detailed herein are focused on locating a particular instantiation of a network function then querying the particular instantiation of the network function for status information. The queries posed to the particular instantiation of the network function can be based on the particular vendor and type of network function in question. A file library may be accessed to obtain a command structure that has been mapped to the particular network function (and possibly vendor).

As an output, a user may be provided with a set of data output by the particular instantiation of the network function for inspection. In some embodiments, an additional component is present that analyzes the set of data output by the particular instantiation and provides an indication of whether the data is normal or abnormal. For example, such data may be reduced to a dashboard that shows the status of many instantiations of the same component across the cellular network.

Figure 1A:
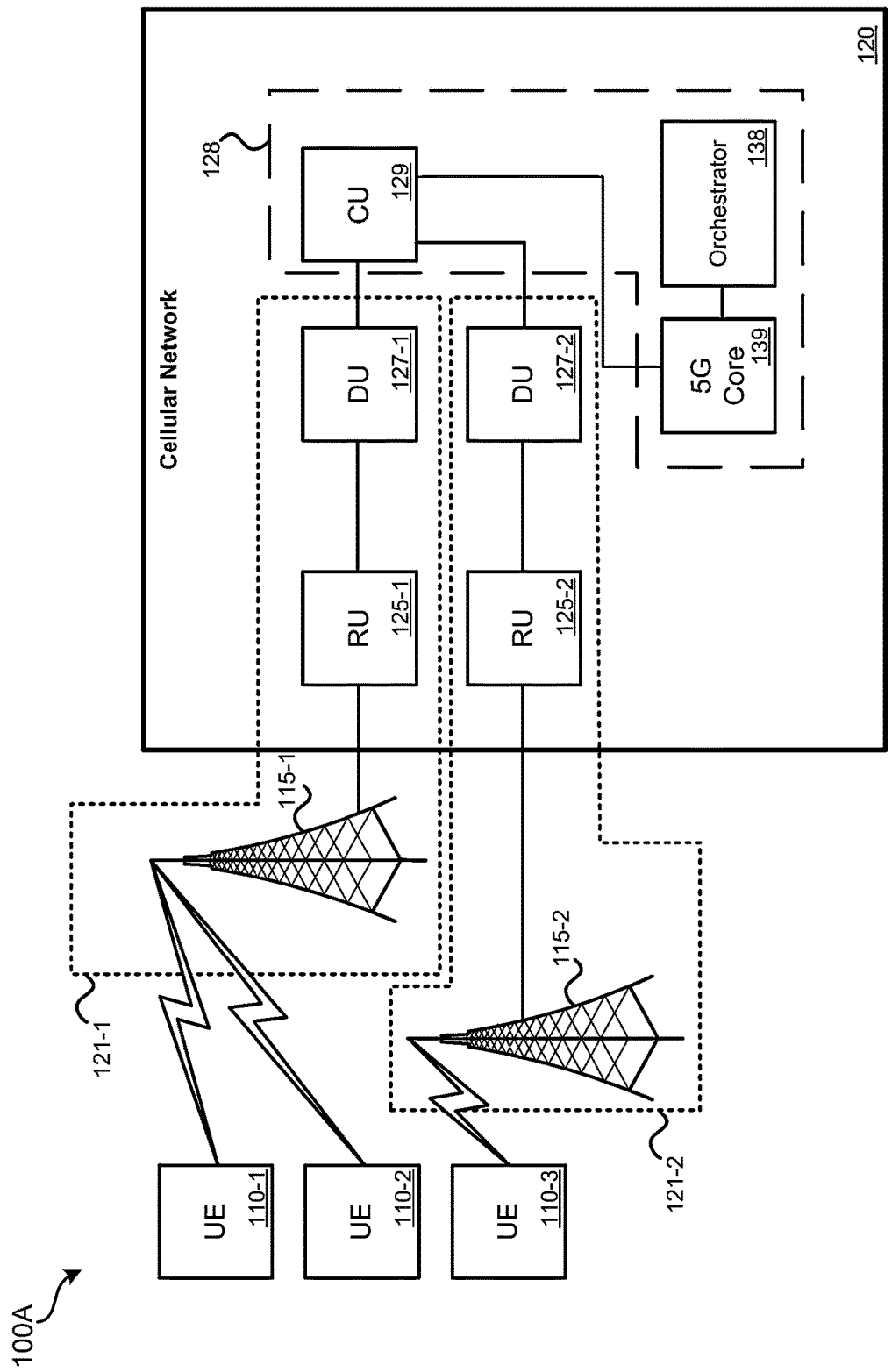
FIG. 1A illustrates an embodiment of a 5G New Radio (NR) cellular network.

Further detail regarding such embodiments and other embodiments is provided in relation to the figures. FIG. 1 illustrates an embodiment of a cellular network system 100A ("system 100A"). FIG. 1 represents an embodiment of a cellular network which can accommodate the cloud-based architecture of FIG. 2. System 100A can include a 5G New Radio (NR) cellular network; other types of cellular networks, such as 6G, 76, etc., may also be possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1; a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 1B:
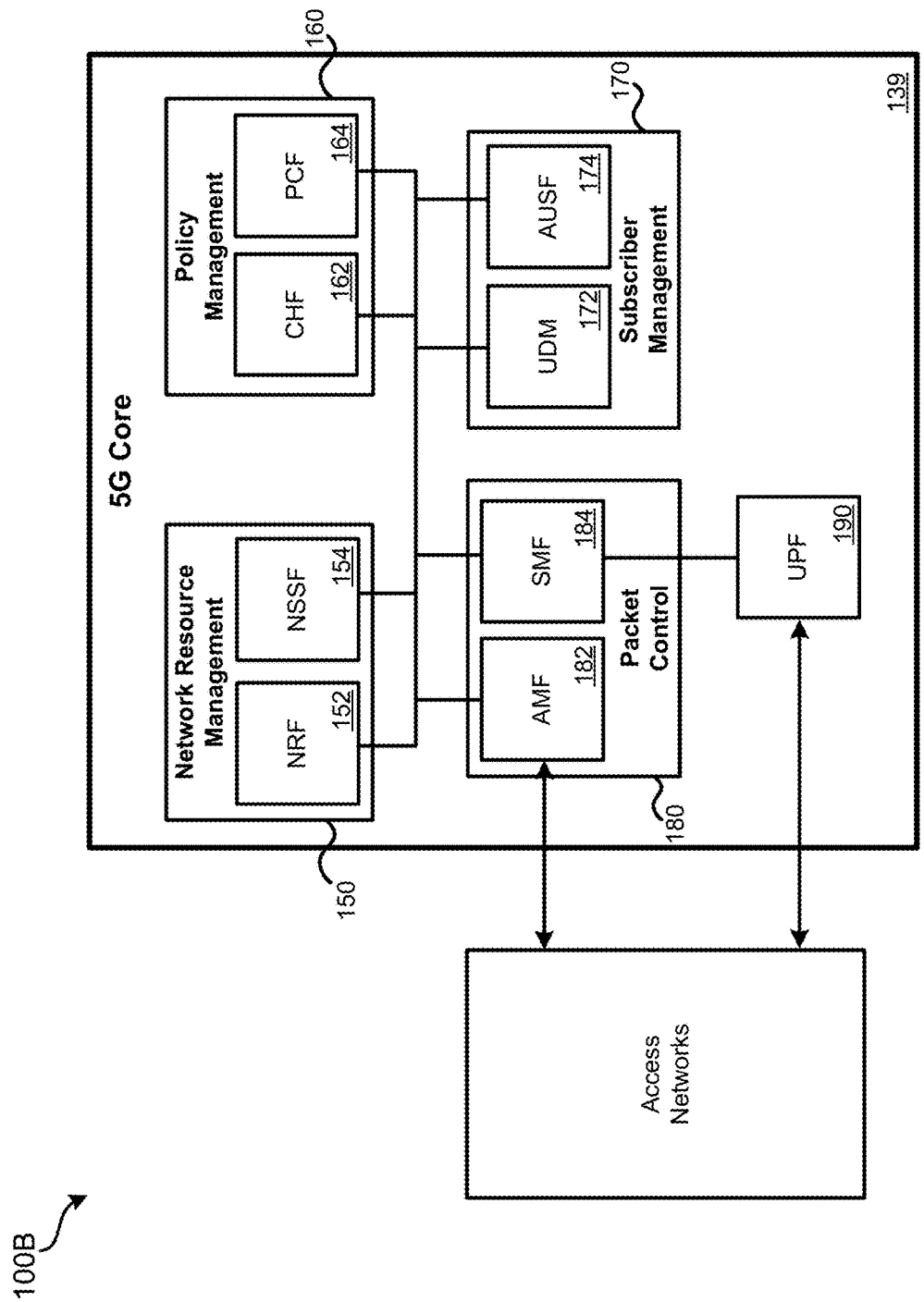
FIG. 1B illustrates an embodiment of a 5G core of the cellular network.

Further detail regarding native 5G Core 139 is provided in relation to FIG. 1B. 5G core 139, which can be physically distributed across data centers or located at a central national data center (NDC), can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

As shown in FIG. 1, 5G core 139 resides on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

Figure 2:
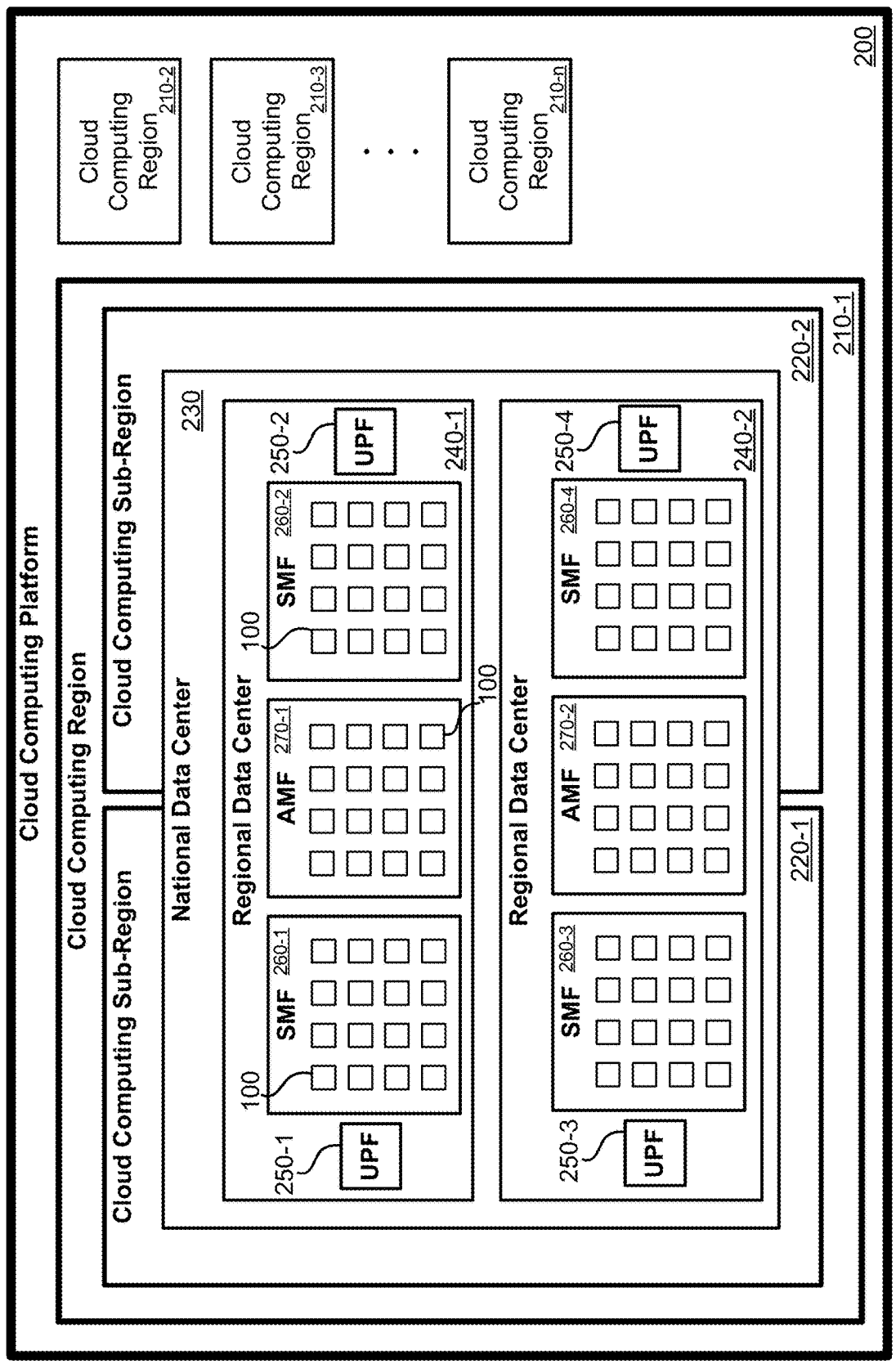
FIG. 2 illustrates an embodiment of a 5G core network topology on a cloud-computing platform.

FIG. 2 illustrates an embodiment of a 5G core network topology on cloud computing platform 200. Cloud computing platform 200 can be logically and physically divided up into various different cloud computing regions 210. Each of cloud computing regions can be isolated from other cloud computing regions to help provide fault tolerance and stability. Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 is illustrated.

Similar components may be executed in other cloud computing regions of cloud computing regions 210 (210-2, 210-3, 210-n).

Each of cloud computing regions 210 may include two or more cloud computing sub-regions 220. Each of cloud computing sub-regions 220 can allow for redundancy that allows for fail-over protection. For example, if a particular cloud computing sub-region experiences an outage, another cloud computing sub-region within the same cloud computing region can continue functioning and providing service. If the cloud computing platform used is Amazon Web Services (AWS), cloud computing sub-regions may be referred to as "availability zones." For example, a database that is maintained as part of NDC 230 may be replicated in each cloud computing sub-region; therefore, if one of cloud computing sub-regions 220 fails, a copy of the database remains up-to-date and available, thus allowing for continuous or near continuous functionality.

In the topology of a 5G NR cellular network, 5G core functions of 5G core 139 can logically reside as part of a national data center (NDC). NDC 230 can be understood as having its functionality existing in multiple (e.g., two, three, or more) cloud computing sub-regions 220 within cloud computing region 210-1. This arrangement allows for load-balancing, redundancy, and fail-over. Within NDC 230, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed on one of cloud computing sub-regions 220, SMFs 260 may be executed across multiple cloud computing sub-regions 220 for redundancy, processing load-balancing, and fail-over.

Each network function can include multiple pods. A "pod" refers to a software sub-component of the network function. To provide simplicity in FIG. 2, each of SMFs 260 and AMFs 270 are shown as including sixteen pods each. This number is merely an example; fewer or greater numbers of pods may be part of the respective 5G core functions. Further, due to space concerns in FIG. 2, no pods are illustrated as part of UPFs 250; UPFs may also include some number of pods that function together to perform the functions of UPF. While three exemplary network functions are illustrated as part of 5G core 139, as indicated in FIG. 1B, various other network functions can additionally or alternatively be present.

As can be seen in FIG. 2, when a significant number of RDCs, NDCs, and cloud computing regions 210 are considered as part of cloud computing platform 200, the number of functions executed across different NDC and RDC instances on cloud computing platform 200 can be high. A user attempting to monitor the health of such a cloud-based cellular network may have a significant amount of "drilling" and querying to do. Drilling refers to locating the instance of a network function that is desired to be queried. For example, an administrator may desire to perform various health checks on the pods of a particular network function that operates in a particular cloud computing sub-region.

Figure 3:
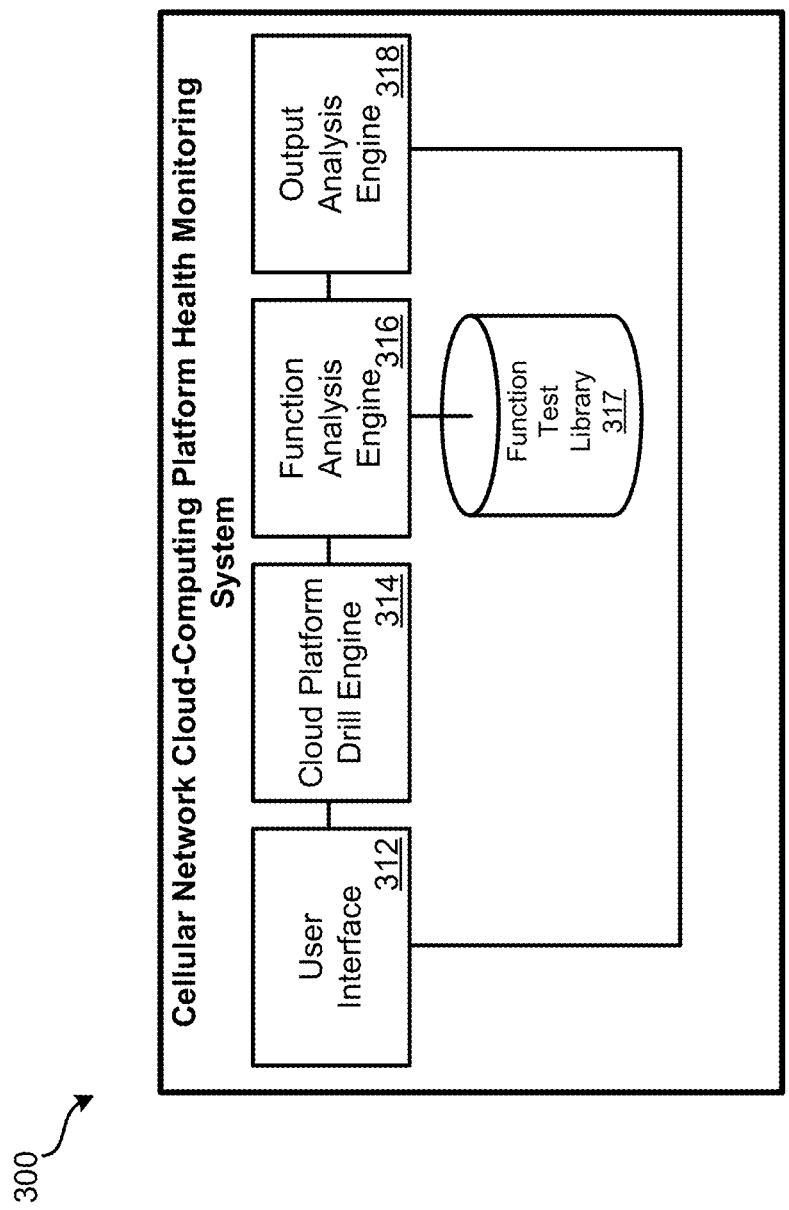
FIG. 3 illustrates an embodiment of a cellular network cloud-computing platform health monitoring system.

FIG. 3 illustrates an embodiment of a cellular network cloud-computing platform health monitoring system 300 ("system 300"). System 300 can include: user interface 312; cloud platform drill engine 314; function analysis engine 316; function test library 317; and output analysis engine 318. Each of such components can be implemented as special-purpose software that executes on the cloud-computing platform or on a computer system that is in communication with the cloud-computing platform of FIG. 2.

User interface 312 can allow a user to interact with system 300. In some embodiments, user interface 312 can be a command line interface. The specific commands that can be submitted via the command line interface can be vendor specific; therefore, for example, the commands used for different vendors' AMFs can vary. Additionally, one or more commands may be issued to the operating system on which the network functions operate. Such commands may not be issued via a command line interface. In other embodiments, a graphical user interface (GUI) may be present. User interface 312 can allow a cellular network administrator to specify the cloud computing region or cloud computing sub-region which the cellular network administrator desires to monitor. The cellular network administrator does not need to know the specific names of the functions, number of instances, or other details of the functions within the cloud computing region or sub-region.

Cloud platform drill engine 314 serves the purpose of identifying instances of the core functions being executed and the pods of such core functions. Via user interface 312, a cellular network administrator can specify the cloud computing region or sub-region to be monitored. In response, the cloud platform drill engine 314 can identify all of the cellular network core function instances and their respective identifiers within the specified cloud computing region or sub-region.

The cellular network administrator may also specify a specific type of network function to be tested. For example, the cellular network administrator may specify that all instances of UPFs are to be tested. In some embodiments, the cellular network administrator may have the option to further specify a particular RDC in which instances of the function, such as the UPFs, are to be tested. Function analysis engine 316 may perform tests and checks that are specific to the network function being tested. The tests and checks may be further specific to the vendor that provides the network function and the version of the network function. A library of function test files may be stored in function test library 317. These test files may each specify one or more specific commands that are used to test a specific vendor's function and/or pods of the function (and, possibly, for a specific version of the function). For example, a function test file may be presented for UPFs from vendor A and a separate function test file may be present in function test library 317 for vendor B. Within each function test file may be one or more commands that, when executed, prompt the executing instance of the network function to provide an output.

Function analysis engine 316 may synthesize the identifier information about the one or more network functions to be monitored from cloud platform drill engine 314 along with the commands from the function test file corresponding to the type of network function, vendor, and/or version from function test library 317 to issue the commands to the correct instance of network function (or pods of the network function) being executed on the cloud-computing platform.

In some embodiments, the raw output data back from the network functions and/or pods in response to the commands issued by function analysis engine 316 are presented to the cellular network administrator for review via user interface 312. In other embodiments, the raw output data back from the network functions and/or pods in response to the commands issued by function analysis engine 316 are passed to output analysis engine 318.

Output analysis engine 318 can take the raw output data received from the functions and/or pods in response to the commands issued by the function analysis engine to the network function and/or pods and condense the data in a user-friendly manner for presentation via user interface 312. For example, the values of multiple parameters may be checked to confirm they are within an acceptable range. If so, output analysis engine 318 may condense the data into an indication that the pod or network function is properly functioning. Output analysis engine 318 may condense data into a dashboard that allows at a glance to see how many network functions and their pods are performing. For example, all network functions within a particular cloud-computing sub-region may be monitored and have an indication of functionality presented on such a dashboard.

In some embodiments, rather than having to select a particular sub-region or region of the cloud-computing platform, separate function test files may be specified in function test library 317 for each sub-region or region. Therefore, a cellular network administrator may only need to specify the particular function test file from function test library 317 in order to test a specific one or more functions in a specific subregion or region on the cloud computing platform. Alternatively, in some embodiments, the region may be specified, which triggers selection of the corresponding function test file from function test library 317.

Figure 4A:
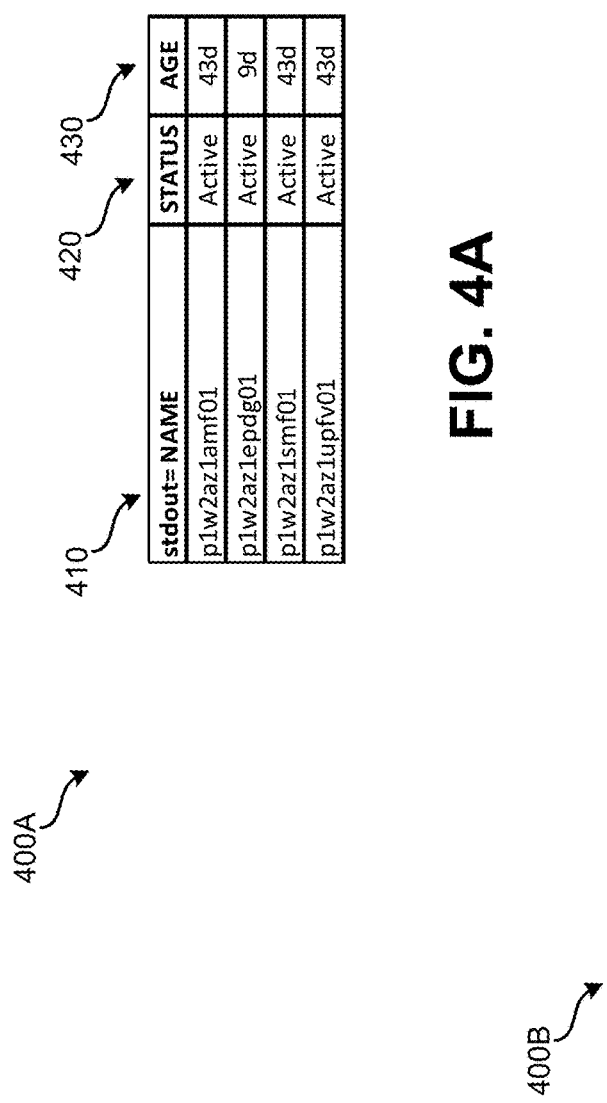
FIG. 4A illustrates an embodiment of active sub-region functions.

FIG. 4A illustrates an embodiment 400A of active sub-region functions. Cloud platform drill engine 314, in response to a request from a user, may obtain the identifiers 410 of each cellular network core function within a particular cloud computing sub-region. In the example of embodiment 400A, four core functions are present, along with corresponding indications 420 of whether the functions are active and indications 430 of how long the functions have been active. As an example, on Amazon Web Services, a command such as "/home/ssm-user/bin/kubectl get ns" can be used to obtain the names of specific network functions that are active within a particular cloud computing sub-region.

Figure 4B:
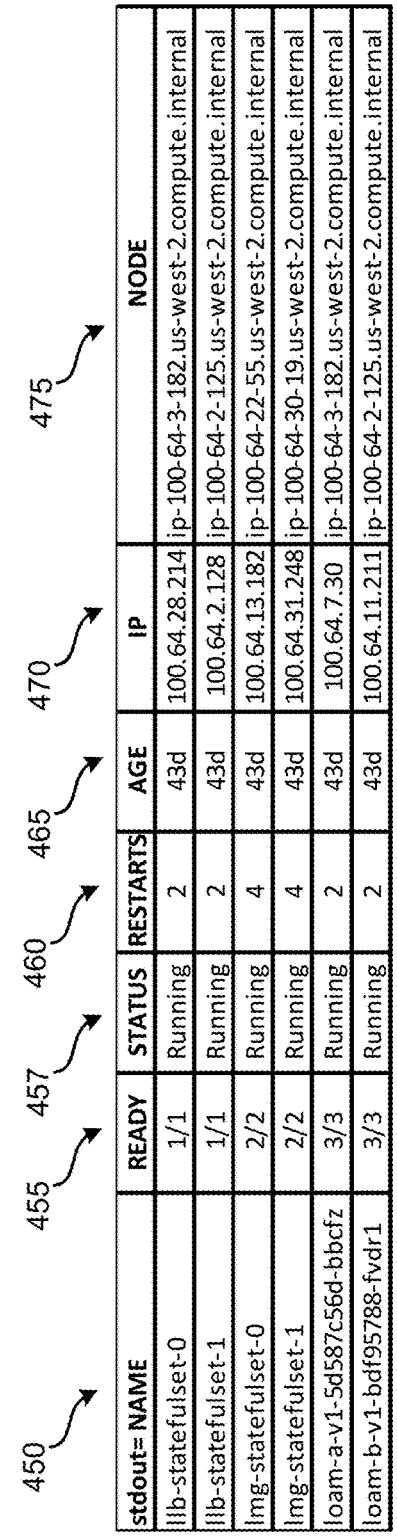
FIG. 4B illustrates an embodiment of pods of a function.

For this example, the cellular network administrator has either specified that they want more information about the SMF function or the cellular network administrator has selected a particular function test file specific to SMFs. FIG. 4B illustrates an embodiment 400B of pods of the function identified by the cellular network administrator. Function analysis engine 316 retrieves identifiers 450 of all of the pods that function as part of the SMF on the cloud computing sub-region. In this example, the listed pods correspond to SMF: "p1w2az1smf01." For the pods of the identified SMF core cellular network function, information is presented, such as: indications of pods being ready 455; statuses 457; numbers of restarts 460; ages 465; IP addresses 470; and nodes 475 of the cloud-computer network on which the pod is executed. As an example, on Amazon Web Services, a command such as "/home/ssm-user/bin/kubectl get pods -n [Network Function Name]-o wide" can be used to obtain the names of specific pods for [Network Function Name] that are active within a particular cloud computing sub-region.

FIG. 5 illustrates an embodiment 500 of pod statuses as determined by the cellular network health monitoring system for a cloud-computing platform. In embodiment 500, based on user input, function analysis engine 316 performs a check on all functions in a given cloud computing sub-region. A report 510 is prepared that indicates the number of pods within each cellular network core function that are functioning properly. A listing 520 can be prepared of all pods that are not functioning correctly within the cloud computing sub-region. In this example, seventeen pods associated with the AMF are not functioning correctly and need addressing by the cellular network administrator. For each of these malfunctioning pods, the following is noted: a corresponding core cellular network function 525; name 530; readiness 535; status 540; number of restarts 545; age 550; IP address 555; and node 560 of the cloud-computing platform that is executing the pod. As an example, on Amazon Web Services, a command such as /usr/bin/python/home/ssm-user/bin/nsPodStatus.pyc" can be used to call a function test file from a defined location that causes the data of embodiment 500 to be output.

Information can be presented for each pod that is not functioning properly. In embodiment 500, for each malfunctioning pod, the following characteristics are indicated: name of cellular network function; name; indication of readiness; status; number of restarts; age; IP address; and a node of the cloud-computing network executing the pod.

Figure 6:
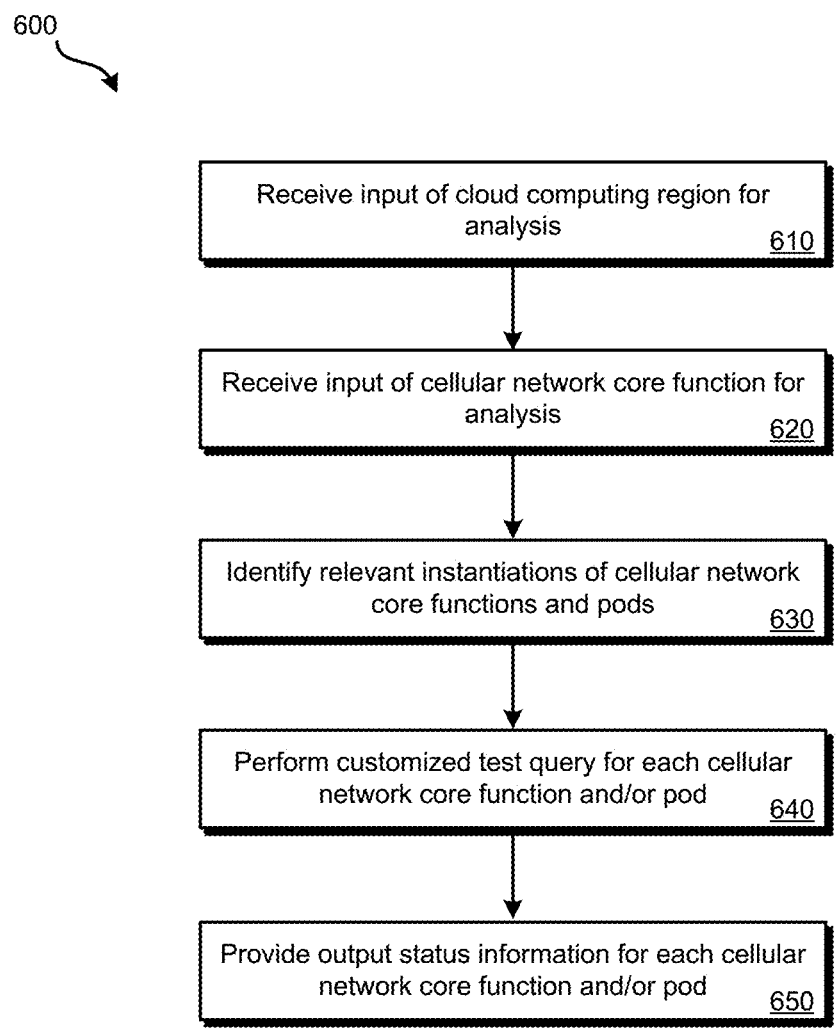
FIG. 6 illustrates an embodiment of a method for performing health monitoring of cellular network functions in a cloud-computing environment.

Various methods may be performed using the systems and arrangements detailed in relation to FIGS. 1-5. FIG. 6 illustrates an embodiment of a method 600 for performing health monitoring of cellular network functions in a cloud-computing environment. Method 600 may be performed on a cloud computing platform that also executes the core functionality of a 5G NR cellular network directly or by a computer system in communication with the cloud computing system that executes the core functionality of the 5G NR cellular network.

At block 610, a cellular network administrator may provide input indicating the cloud computing region or sub-region for which analysis or monitoring is to be performed. This input may be received by the cellular network cloud-computing platform health monitoring system. In some embodiments, the user may select the appropriate region or sub-region from a list or may otherwise enter an identifier for the correct region.

At block 620, a cellular network administrator may provide an input of one or more cellular core functions to be analyzed or monitored. This input may be received by the cellular network cloud-computing platform health monitoring system. In some embodiments, the user may select the appropriate one or more cellular network functions from a list or may otherwise enter an identifier for the correct one or more functions. In some embodiments, blocks 610 and 620 may be combined in the form of selection of a file. The cellular network administrator may select a particular test configuration file that is preconfigured for the correct sub-region and the correct one or more network functions.

At block 630, the cellular network cloud-computing platform health monitoring system may identify relevant instantiations of the core functions and the pods of such core functions that are executed in the cloud computing region or sub-region specified at block 610. The health monitoring system can identify the instantiations of the network functions within the specified cloud computing region or sub-region that corresponds to the types of one or more cellular network functions specified at block 620. In some embodiments, the identifiers of each function are output, such as indicated in FIG. 4A and/or identifiers of the pods of one or more cellular network functions are output, such as presented in FIG. 4B.

At block 640, for each cellular network function and/or for each pod of the one or more cellular network functions specified at block 620, a customized test query can be performed, such as based on a file that contains commands specific to the network function, vendor, version, and/or pod from a function test library. This can involve some number of test or monitoring queries being passed to the network functions or pods.

At block 650, status information for each cellular network function selected at block 620 with the cloud-computing region or sub-region can be provided. For cellular network functions and their pods that are functioning correctly, a limited status may be presented, such as indicated in FIG. 5. For cellular network core functions and pods that are not functioning correctly, expanding information may be provided to help the cellular network administrator diagnosis the problem.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing health monitoring of cellular network functions in a cloud-computing environment, the method comprising:
    receiving, by a cellular network health monitoring system, selection of a cloud computing region from a plurality of cloud computing regions for analysis from a user via a user interface, wherein
        a cellular network core is implemented on a cloud computing platform that comprises the plurality of cloud computing regions that includes the cloud computing region;
    receiving, by the cellular network health monitoring system, selection of a cellular core function from a plurality of cellular core functions for analysis from the user via the user interface, wherein
        the plurality of cellular core functions is executed within the cloud computing region on the cloud computing platform;
    identifying, by the cellular network health monitoring system, a plurality of pods of the cellular core function executed within the cloud computing region;
    performing, by the cellular network health monitoring system, a customized test query based on the input of the cellular core function; and
    outputting, by the cellular network health monitoring system, a report comprising statues of the plurality of pods of the cellular core function based on the customized test query, wherein the report comprises for each pod of the plurality of pods:
        a name; status; a number of restarts; an age, and a name of a node of the cloud computing platform executing the pod.

2. The method for performing health monitoring of cellular network functions in the cloud-computing environment of claim 1, the method further comprising:
    accessing a library of customized test query files; and
    retrieving a customized test query file based on the input of the cellular core function, wherein the customized test query is obtained from the retrieved customized test query file.

3. The method for performing health monitoring of cellular network functions in the cloud-computing environment of claim 1, wherein the cellular network core is a 5G New Radio (NR) native cellular core.

4. The method for performing health monitoring of cellular network functions in the cloud-computing environment of claim 1, wherein the status of the cellular core function comprises a status of each pod of the pods of the cellular network function.

5. The method for performing health monitoring of cellular network functions in the cloud-computing environment of claim 1, wherein the cellular network core function is selected from the group consisting of:
    an access and mobility management function (AMF);
    a session management function (SMF); and
    a user plane function (UPF).

6. The method for performing health monitoring of cellular network functions in the cloud-computing environment of claim 1, wherein the cellular network core comprises a plurality of logical regional data centers that reside within a national data center.

7. The method for performing health monitoring of cellular network functions in the cloud-computing environment of claim 6, wherein each logical regional data center of the plurality of logical regional data centers comprises a common plurality of cellular core functions.

8. The method for performing health monitoring of cellular network functions in the cloud-computing environment of claim 1, the method further comprising:
    outputting, by the cellular network health monitoring system, an indication of a pod of the cellular core function that is not functioning properly.

9. The method for performing health monitoring of cellular network functions in the cloud-computing environment of claim 1, the method further comprising:
    outputting, by the cellular network health monitoring system, a unique identifier of an instantiation of the cellular core function executed within the cloud computing region.

10. The method for performing health monitoring of cellular network functions in the cloud-computing environment of claim 1, the method further comprising:
    outputting, by the cellular network health monitoring system, a node identifier at which pods of the cellular core function are executed based on the customized test query, wherein the node identifier refers to a server system of the cloud computing platform.

11. A cellular network implemented using a cloud computing platform, comprising:
    a national data center (NDC) executing on the cloud computing platform across multiple cloud computing subregions, wherein:
        the NDC comprises a plurality of regional data centers (RDCs) executing across the cloud multiple cloud computing subregions;
    a plurality of network functions of a 5G New Radio (NR) cellular core executed within each RDC of the plurality of RDCs, wherein:

each network function of the plurality of network functions comprises a plurality of pods; and
a cellular network health monitoring system, configured to:
receive input of a cloud computing region for analysis, wherein a cellular network core is implemented on the cloud computing platform that comprises a plurality of cloud computing regions that includes the cloud computing region;
receive input of a cellular core function for analysis, wherein a plurality of cellular core functions is executed within the cloud computing region on the cloud computing platform;
identify instantiations of the cellular core function and pods of the cellular core function executed within the cloud computing region;
perform a customized test query based on the input of the cellular core function; and
output a report comprising statues of the plurality of pods of the cellular core function based on the customized test query, wherein the report comprises for each pod of the plurality of pods:
a name and a name of a node of the cloud computing platform executing the pod.

12. The cellular network implemented using a cloud computing platform of claim 11, wherein the cellular network health monitoring system is executed on the cloud computing platform.

13. The cellular network implemented using a cloud computing platform of claim 12, wherein the cellular network core function is selected from the group consisting of:
an access and mobility management function (AMF);
a session management function (SMF); and
a user plane function (UPF).

14. A non-transitory processor-readable medium, comprising processor-readable instructions configured to cause one or more processors to:
receive input of a cloud computing region for analysis, wherein a cellular network core is implemented on a cloud computing platform that comprises a plurality of cloud computing regions that includes the cloud computing region;
receive input of a cellular core function for analysis, wherein a plurality of cellular core functions is executed within the cloud computing region on the cloud computing platform;
identify instantiations of the cellular core function and a plurality of pods of the cellular core function executed within the cloud computing region;
perform a customized test query based on the input of the cellular core function; and
output a report comprising statues of the plurality of pods of the cellular core function based on the customized test query, wherein the report comprises for each pod of the plurality of pods:
a name; an age, and a name of a node of the cloud computing platform executing the pod.

15. The non-transitory processor-readable medium of claim 14, wherein the processor-readable instructions are further configured to cause the one or more processors to:
access a library of customized test query files stored on the cloud computing platform; and
retrieve a customized test query file based on the input of the cellular core function, wherein the customized test query is obtained from the retrieved customized test query file.

16. The non-transitory processor-readable medium of claim 14, wherein the cellular network core is a 5G New Radio (NR) native cellular core.

17. The non-transitory processor-readable medium of claim 14, wherein the status of the cellular core function comprises a status of each pod of the pods of the cellular network function.

18. The non-transitory processor-readable medium of claim 14, wherein the cellular network core function is selected from the group consisting of:
an access and mobility management function (AMF);
a session management function (SMF); and
a user plane function (UPF).

19. The non-transitory processor-readable medium of claim 14, wherein the cellular network core comprises a plurality of logical regional data centers that reside within a national data center.

20. The non-transitory processor-readable medium of claim 19, wherein each logical regional data center of the plurality of logical regional data centers comprises a common plurality of cellular core network functions.

* * * * *